HANDLING DEVICE FOR INFORMATION CARRYING SHEETS

Filed April 2, 1970 3 Sheets-Sheet 1

MANFRED LEUTWEIN
HEINZ STREICHER
INVENTORS

BY R. Lewis Gable
Robert W Hampton
ATTORNEYS

HANDLING DEVICE FOR INFORMATION CARRYING SHEETS

MANFRED LEUTWEIN
HEINZ STREICHER
*INVENTORS*

BY R. Lewis Gable
Robert W. Hampton
ATTORNEYS

HANDLING DEVICE FOR INFORMATION CARRYING SHEETS

MANFRED LEUTWEIN
HEINZ STREICHER
*INVENTORS*

BY R. Lewis Gable
Robert W Hampton
ATTORNEYS 3,702,697

HANDLING DEVICE FOR INFORMATION CARRYING SHEETS

Manfred Leutwein, Rommelshausen, and Heinz Streicher, Echterdingen, Germany, assignors to Eastman Kodak Company, Rochester, N.Y.

Filed Apr. 2, 1970, Ser. No. 25,183
Claims priority, application Germany, Apr. 2, 1969, P 19 16 863.9
Int. Cl. B65h *5/06, 29/22*
U.S. Cl. 271—3 11 Claims

ABSTRACT OF THE DISCLOSURE

Apparatus is disclosed for receiving a cartridge or magazine storing a stack of information bearing media and for selectively transporting in succession information bearing media in a stack of similar media, either in a first apparatus mode, from a first position in the stack to a utilization station and back to a last position in the stack, or in a second apparatus mode, from a last position in the stack to the utilization station and back to a first position in the stack.

BACKGROUND OF THE INVENTION

Field of the invention

The present invention relates to apparatus for handling information bearing sheets or media which are directed separately in succession from a stack of similar media into a viewing station and then withdrawn therefrom.

Description of the prior art

Apparatus for handling information bearing media in combination with projection apparatus is known in the art as illustratively described in German Pat. No. 1,226,-331. In the aforementioned patent, there is shown a projection reader wherein a viewing station is disposed between a pair of magazines. One of the magazines serves as a supply magazine while the other is a storage magazine for receiving the information bearing media. The information bearing media are conveyed in succession from the supply magazine through the viewing station to the storage magazine by means of a conveyor belt. Such an arrangement will, due to the space required for accommodating both magazines, considerably increase the overall dimension of the apparatus. Moreover, the conveying distance between the magazine tends to be quite long resulting in an apparatus of greater cost. Furthermore, in order to retain the sequence of the stack of information bearing media, the complete stack may have to be taken from one magazine and placed in the other for each operation, or may have to be returned to the supply magazine in the case where each of the magazines bears indicia identifying their contents.

SUMMARY OF THE INVENTION

It is therefore an object of this invention to facilitate the handling of a stack of information bearing media and to permit the feeding of the media to and from a single magazine while maintaining the sequence of the stack of information bearing media.

This and other objects are met in accordance with the teachings of this invention by providing apparatus for conveying information bearing media to and from a stack of the media. In particular, the media handling apparatus includes first and second rollers disposed in an operative relationship with the first and last medium in the stack, respectively, for directing a medium to and from the stack, first and second channels leading from the first and last media of the stack to a common point, a third channel passing from the common point through a utilization or projection station, and a reversible roller disposed adjacent the conjunction of the first and second channels at a distance of about one information bearing medium from the end of the third channel. In order to insure the reversal of the motion of the information bearing medium within the third channel, a switch is disposed at the end of the third channel remote from the third roller to be actuated by the leading end of an information bearing medium.

BRIEF DESCRIPTION OF THE DRAWINGS

In the detailed description of the preferred embodiment of the invention presented below, reference is made to the accompanying drawing, in which.

BRIEF DESCRIPTION OF THE PREFERRED EMBODIMENT

Figures 1, 2, 4:
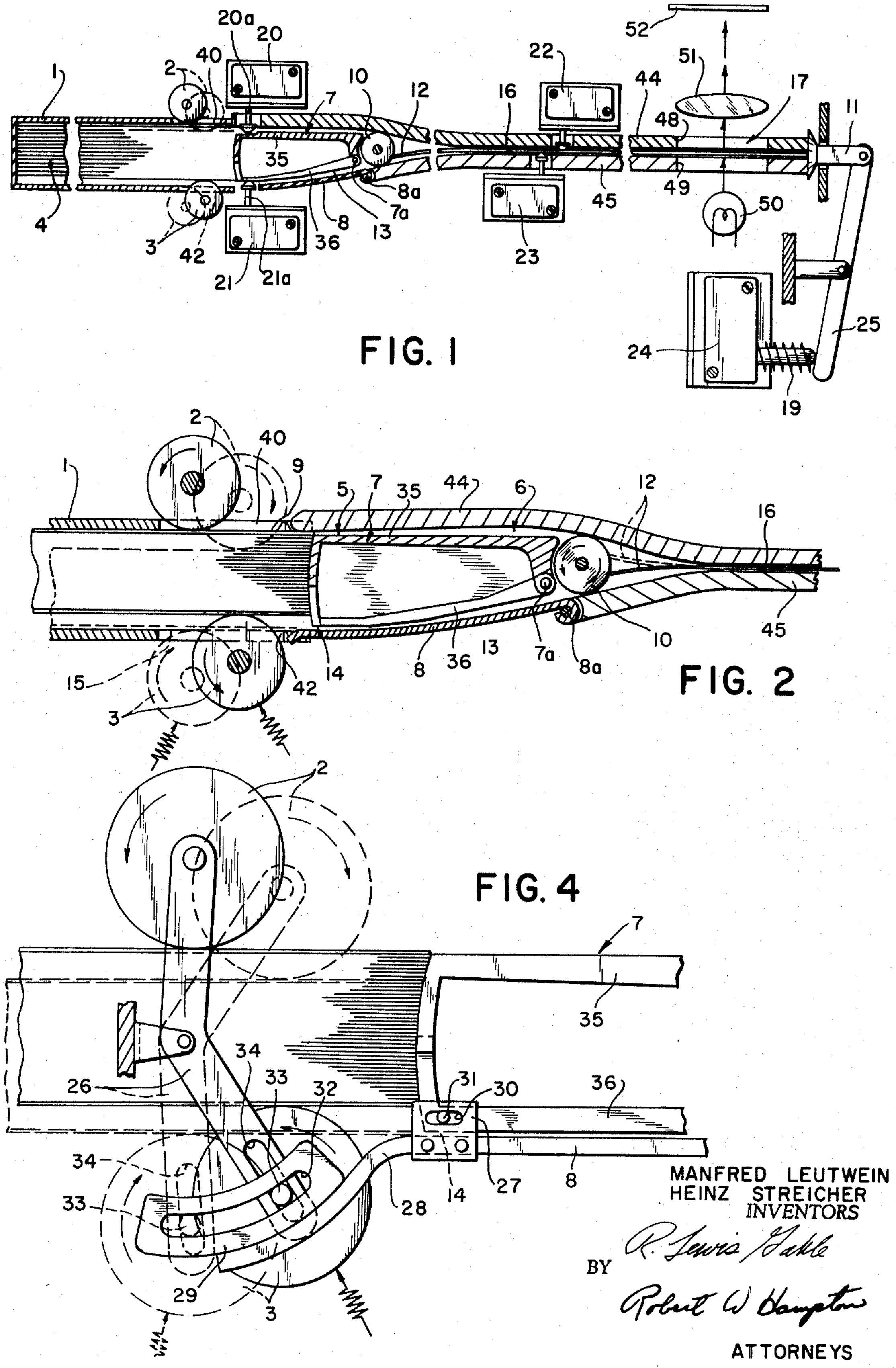
FIG. 1 is a sectioned view of the apparatus for handling information bearing media in accordance with the teachings of this invention.
FIG. 2 is an enlarged, sectioned view of the apparatus shown in FIG. 1, particularly showing the arrangement of the rollers and the media conveying channels.
FIG. 4 shows an enlarged, sectioned view of the apparatus of FIG. 1 showing in particular the assembly for moving the rollers into operative relation with the first and last documents of the stack and to control selectively the position of the channels leading to the stack of documents in response to the aforesaid movement.

With reference to the drawing and in particular FIG. 1, there is shown apparatus for handling a stack 4 of cards or information bearing media. The media handling apparatus includes a magazine 1 for receiving a stack 4 of information bearing media. Typically, the information bearing media could take the form of a filing or aperture card having a microfiche insert, and a stack may contain illustratively in the order of 100 such media. As shown in FIGS. 1 and 2, the magazine 1 has an opening to permit the transport of the information bearing media to the right and is further provided with access openings 40 and 41 in the top and bottom walls of the magazine 1 through which a pair of conveying rollers 2 and 3 may be disposed in an operative relation with the first and last media of the stack 1, respectively. Upon insertion of the magazine 1, an unlocking key (not shown) is actuated to thereby release the conveying rollers 2 and 3, and to permit the rollers 2 and 3 to come into contact with the media of the stack 1. With reference to FIGS. 2 and 4, the conveying rollers 2 and 3 serve to press the media of the stack 4 together independent of the thickness of the stack 4. At least one of the pair of conveving rollers 2 and 3 is spring biased to thereby press the rollers 2 and 3 together. As shown in FIG. 4, the conveying rollers 2 and 3 may be rotatively mounted upon a lever 26. In one illustrative embodiment, the roller 3 may be rotatively mounted upon a pin 33, which is in turn journaled within a slot 34 of the lever 26. Thus, as the dimension of the stack 4 becomes smaller, the lever 26 may rotate and the roller 3 may slide along the slot 34 under the influence of the spring biasing means to bring the conveying rollers 2 and 3 into contact with the first and last medium of the stack 4. As shown in FIG. 2, the forward transport of the media is effected in accordance with the roller positions and the sense of rotation indicated by the schematic circles and arrows. Thus, to advance a medium from the top of the stack 4, the bottom portion of the periphery of the conveying roller 2 is positioned approximately at an area or surface 9 which is coincident with a mouth or passage 5 ,and the conveying roller 2 is driven in a counter-clockwise direction to thereby direct the first or topmost card through the mouth 5. The conveying roller 3 is urged towards the conveying roller 2 under the biasing action of the spring means and engages the bottom most or last media of the stack 4.

With regard to FIG. 4, the lever 26 and the rollers 2 and 3 may be moved between a first position shown in solid line and a second position shown in dotted line. The lever 26 may be moved between these positions by any known means either manually by a handle, knob, or the like, or electromagnetically by means of a solenoid, relay, motor, or the like. When the lever 26 and the rollers 2 and 3 are moved from one operative position to the other, the direction of rotation of the rollers 2, 3 and 10 is automatically reversed. This change of rotation may be effected in a manner well known in the art, for example, by reversing the direction of rotation of the driving motor or motors, by a reversal of an interconnecting gear.

When the roller 2 is rotatively driven in a counter-clockwise direction as seen in FIG. 2, the conveying roller 2 moves the first or topmost information bearing medium through the passage 5, which is so dimensioned that only one information bearing medium may be passed at a time through the mouth 5 into a channel 6. The conveying channel 6 is formed between the first member 35 of a stop comb 7 and a guide member 44. As the information bearing medium is moved to the right under the influence of the conveying roller 2, a conveying roller 10 will engage the advancing medium for further transport into a channel 16 formed between the first guide member 44 and a second guide member 45 as shown in FIG. 1. Upon further passage of the medium, a switch 23, whose actuation member is disposed within the channel 16, will be actuated to thereby stop the imparting of a rotational drive to the conveying roller 2. The length of the channel 16 from the periphery of the roller 10 to its end is substantially equal to the length of an information medium. As shown in FIG. 1, a spring biased stop member 11 is disposed at the end of the channel 16 and is coupled by a lever 25 to a switch 24. A spring 19 serves to bias the lever member 25 and therefore the stop 11 towards the end of the channel 16. When the front or leading edge of the information bearing medium contacts the stop 11, the switch 24 will actuate to discontinue the application of a rotative drive to roller 10. When the roller 10 is stopped, the rear edge of the information bearing medium will be flexed downward to assume the position indicated at 12 in FIG. 2. The media has now been disposed so that the information stored thereon is disposed in registration with a viewing or projection station 17. As shown in FIG. 1 the first and second guide members 44 and 45 have respectively therein apertures 48 and 49 which define a projection or utilization station 17. In one illustrative embodiment of this invention, the images carried by the medium may be projected by suitable projection means comprising a source 50 of radiation and a lens 51 onto a suitable display surface or screen 52.

Figure 3:
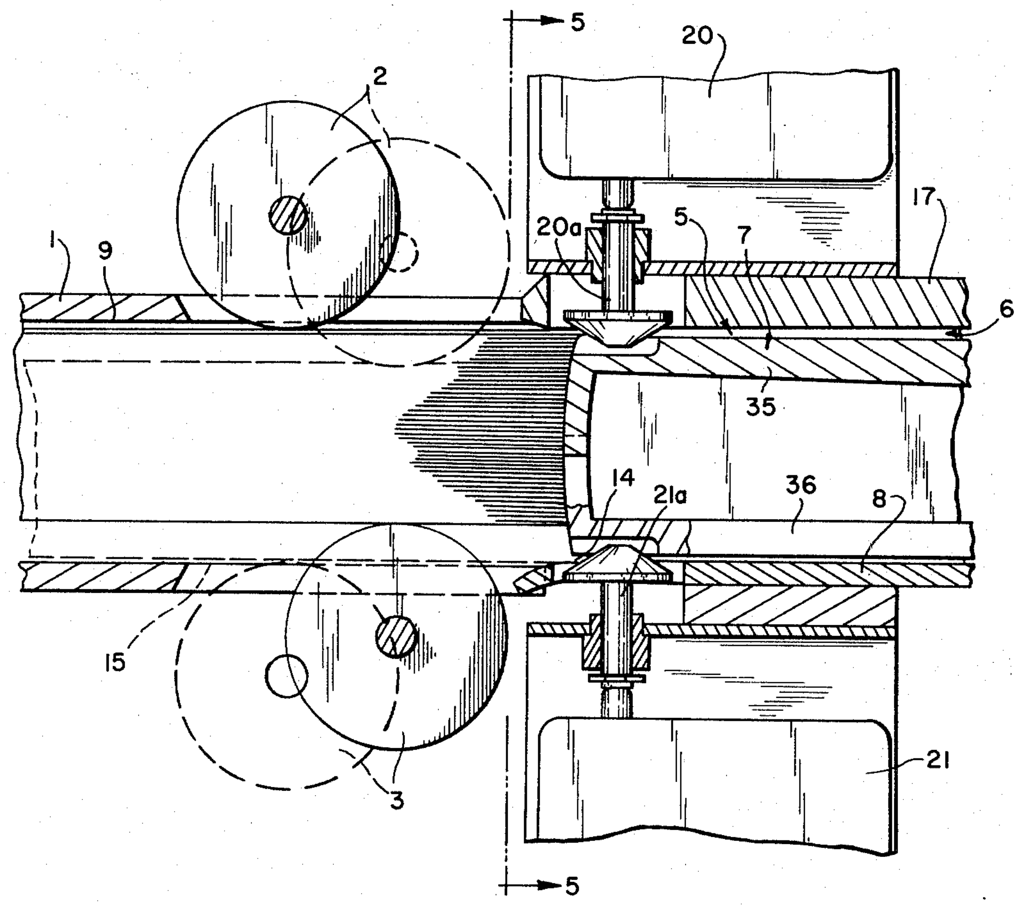
FIG. 3 is an enlarged, sectioned view of the apparatus of FIG. 1 showing the stack of the information bearing media and the first and second channels directed therefrom.
Figure 5:
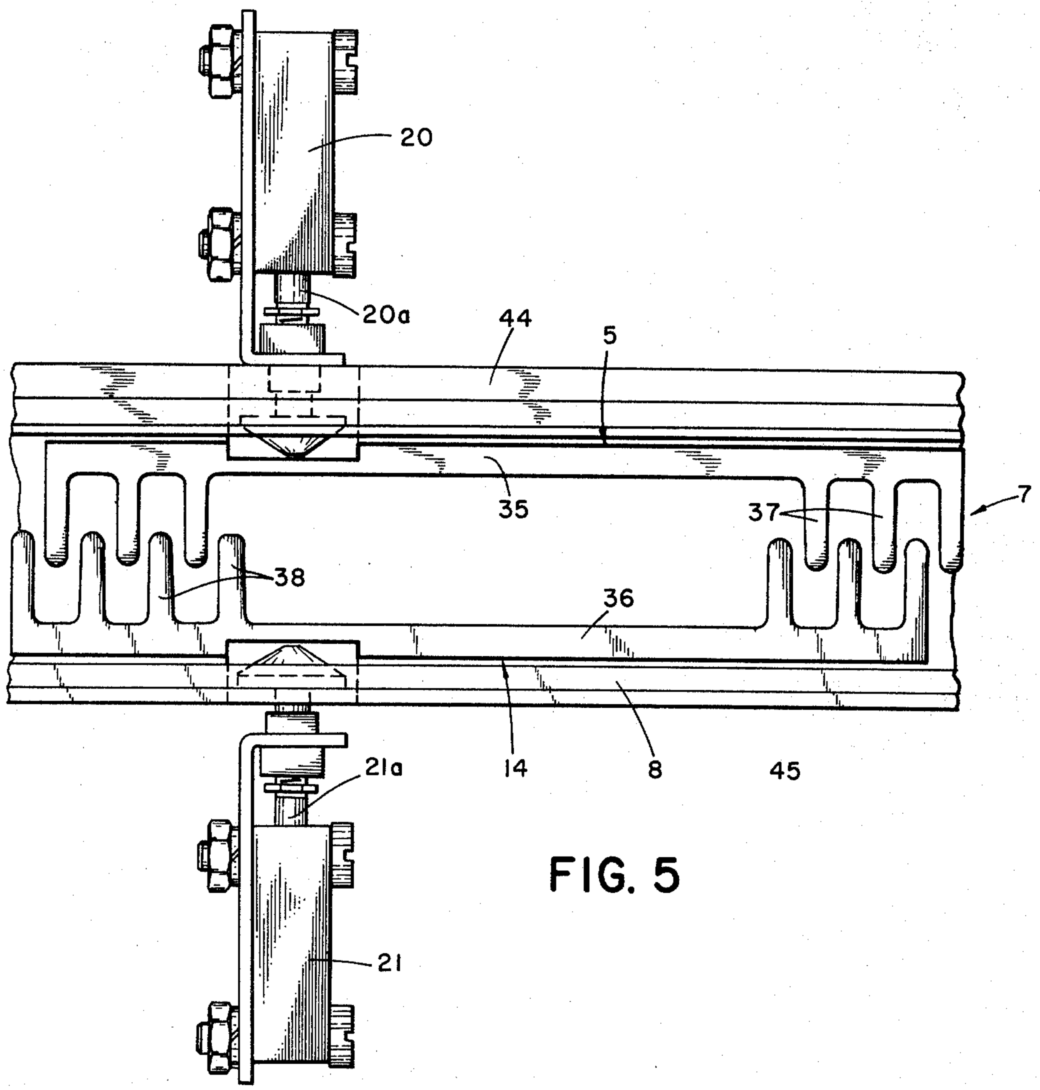
FIG. 5 is a sectioned view taken along line 5—5 of FIG. 3.

When it is desired to sense or project the next information bearing medium in the stack 4, a suitable control is actuated to thereby apply a rotational motion to the conveying rollers 2, 3 and 10 according to the arrows shown in solid lines. Upon rotation of roller 10, the medium is urged by the stop 11 under the influence of the spring 19 to the left as shown in FIG. 1 into the operating region of rotating roller 10. The roller 10 will then direct the information bearing medium no longer required in the viewing station 17 from the channel 16 and into a conveying channel 13 formed between a second or lower member 36 and a hinged guideplate 8. As shown in FIG. 1, a switch 22 is disposed so that its actuating member is disposed within the channel 16. As soon as the medium to be removed has cleared the actuating member of switch 22, the conveying roller 3 is coupled to a rotating motion to thereby transport the medium into the magazine 1. As shown in FIG. 2, the medium is directed through the channel 13 and from a mouth 14 selectively disposed at a surface 15 coincident with the bottom or lowest medium in the stack 4. With reference to FIG. 3, there is shown a switch 21 having an actuation member 21*a* disposed within the mouth 14. It is noted that the other actuating members of the various switches shown in FIG. 1 may closely resemble the actuating members 20*a* and 21*a* shown in FIG. 3. After the medium has cleared the actuating member 21*a*, the conveying roller 3 is switched off after a suitable time delay to permit the medium to be transported completely into the magazine 1. While the first medium has been removed, the conveying roller 2 has simultaneously moved the next information bearing medium from the stack 4, through the mouth 5 and channel 6 into the operating region of the conveying roller 10, which in turn transports the next medium to the viewing station 17.

If it is desirable to transport the information bearing media continuously through the apparatus, it would be only necessary to render inoperative, for the duration of the continuous transport, the switches 20, 21, 22, 23 and 24. This can illustratively be accomplished by means of an additional switching control in a manner well known in the art.

If it is desired to transport the information bearing media in the reverse direction, the conveying rollers 2 and 3 may be moved by the lever 26 to the second position shown in dashed lines and the direction of rotation of the rollers 22 and 23, and the rotation of rollers 10 may be reversed. When the conveying roller 3 is rotatively driven, the lowest or last information bearing medium in stack 4 is transported to the right as seen in FIGS. 1 and 2 through the mouth 14 and the channel 13, and into the operative region of the roller 10. It is noted that the rollers 2 and 3 position the last medium in the stack 4 at the area or surface 15 which is adjacent to and aligned with the mouth 14 leading to the channel 13. Upon actuation of switch 23, the conveying roller 3 is switched off and the roller 10 continues to transport the medium until the leading edge of the medium actuates switch 24 through the stop 11 and the lever 25, at which time the roller 10 is switched off. Upon re-energization of roller 10, the medium is urged by the stop 11 under the influence of the spring 19 into the operating region of the roller 10 and is transported to the operative region of roller 2, which in turn transports the medium through the transport channel 6. When the medium has cleared switch 22, transport roller 2 is energized to continue to feed the medium from the channel 6, through the mouth 5 and into the stack 4 until switch 20 has been cleared to initiate a time delay, after which the roller 2 will be de-energized.

The maximum number of media within the stack 4 is limited by the capacity of the magazine 1, while the minimum number of media can be varied. In the case of a comparatively small stack 4 of media, the conveying rollers 2 and 3 will be positioned realtively close to each other, and it may be desirable to reduce the distance between the mouths 5 and 14 to insure the proper return of the media into the stack 4. For this purpose the structure covering the open end of the magazine 1 may illustratively take the form of the stop comb 7 made up of the first and second members 35 and 36 which are joined by a hinge or post 7*a*. As shown in FIG. 2, the channel 13 is formed by the second member 36 and the guideplate 8, which is pivotally mounted on a hinge or post 8*a*. This arrangement is designed so that the second member 36 and the guideplate 8 will change their position jointly with the roller 3, which presses against the stack 4 under spring action. With respect to FIG. 4, a mounting plate 27 is secured by suitable means to the guideplate 8 and also to the second member 36 by a pin 31 which is disposed within a slot 30 of the plate 27. The bracket 29 has a slot 32 for receiving the pin 33. Thus, the plate 27 is coupled by a support arm 28 and the bracket 29 to the movement of the conveying roller 3. As a result, when the roller 3 is correctly positioned by the lever 26 and the spring biasing means, the second member 36 and the guide member 8 may move therewith to thereby effectively adjust the position of the mouth 14 with respect to the stack 4.

The present invention has been described in detail with particular reference to preferred embodiments thereof, but it will be understood that variations and modifications can be effected within the spirit and scope of the invention.

We claim:

1. Apparatus for selectively transporting in succession information bearing media in a stack of similar media, either in a first apparatus mode, from a first position in the stack to an utilization station and back to a last position in the stack, or in a second apparatus mode, from a last position in the stack to the utilization station and back to a first position in the stack, comprising:

means for supporting such a stack;

first channel means for directing one such medium to the utilization station;

second channel means located between said supporting means and said first channel means, for directing one such medium from the first position in the supported stack to said first channel means in said first apparatus mode and for directing one such medium from said first channel means to the first position in the stack in said second apparatus mode;

third channel means located between said supporting means and said first channel means for directing one such medium from said first channel means to the last position in the stack in said first apparatus mode and for directing one such medium from the last position in the stack to said first channel means in said second apparatus mode;

a first conveying roller rotatable in first and second opposite directions and located so, as upon rotation in said first direction in said first apparatus mode, to transport one such medium along said second channel means into said first channel means, and from said first channel means and along said third channel means and so, as upon rotation in said second direction in said second apparatus mode, to transport one such medium along said third channel means into said first channel means, and from said first channel means and along said second channel means; and first means for selectively rotating said first conveying roller in said first and second directions.

2. Apparatus as claimed in claim 1, wherein said first channel means has an end remote from said first conveying roller, said remote end being disposed a distance from said first conveying roller substantially equal to the dimension of one information bearing medium.

3. Apparatus as claimed in claim 2, wherein there is included switch means disposed to be actuated by the presence of the leading edge of the information bearing medium at said remote end.

4. Apparatus as claimed in claim 2, wherein there is included switch means responsive to the presence of the leading edge of an information bearing medium at said remote end to deactuate said first means for selectively rotating.

5. Apparatus as claimed in claim 1, wherein there is included second and third rotatable conveying rollers, located to engage information bearing media disposed at the first and last positions in the stack, respectively.

6. Apparatus as claimed in claim 5, wherein there is included second means for selectively rotating said second and third rollers, and wherein there is further included second and third switch means disposed to be actuated by the passage of an information bearing medium to deactuate said second means for selectively rotating.

7. Apparatus as claimed in claim 1, wherein there is included second and third conveying rollers, and means for rotatively mounting said second and third conveying rollers to permit the joint movement of said second and third conveying rollers between a first and a second position.

8. Apparatus as claimed in claim 7, wherein there is included means for resiliently biasing at least one of said second and third conveying rollers toward the other of said rollers.

9. Apparatus as claimed in claim 1, wherein said second and third channel means have first and second mouths respectively communicating with the first and last positions in a supported stack, at least one of said second, and said third channel means being adjustably disposed to facilitate a change of the spacing between said first and second mouths.

10. Apparatus as claimed in claim 9 wherein there is included second and third conveying rollers for respectively engaging the information bearing media disposed at the first and last positions in the stack, and means for resiliently biasing at least one of said second and third conveying rollers, said biasing means being operatively coupled to said third channel means to facilitate the change of spacing between said first and second mouths.

11. Apparatus as claimed in claim 10, wherein the direction of rotation of said second and third conveying rollers is reversible.

References Cited

UNITED STATES PATENTS

| | | | |
|---|---|---|---|
| 3,556,511 | 1/1971 | Howard | 271—4 |
| 3,438,621 | 4/1969 | Tajima | 271—3 |
| 2,995,976 | 8/1961 | Weingart | 271—3 X |
| 2,745,664 | 5/1956 | Davies et al. | 271—3 |
| 3,337,213 | 8/1967 | La Barre | 271—3 |

EVON C. BLUNK, Primary Examiner

B. H. STONER, Jr., Assistant Examiner

U.S. Cl. X.R.

271—36